(12) United States Patent
Sun et al.

(10) Patent No.: US 7,301,981 B2
(45) Date of Patent: Nov. 27, 2007

(54) METHODS FOR SYNCHRONIZED PULSE SHAPE TAILORING

(75) Inventors: Yunlong Sun, Beaverton, OR (US); Lei Sun, Aloha, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 206 days.

(21) Appl. No.: 11/067,319

(22) Filed: Feb. 25, 2005

(65) Prior Publication Data

US 2006/0126678 A1    Jun. 15, 2006

Related U.S. Application Data

(60) Provisional application No. 60/635,053, filed on Dec. 9, 2004.

(51) Int. Cl.
*H01S 3/082* (2006.01)

(52) U.S. Cl. .......................... 372/97; 372/10; 372/22; 372/93; 372/21

(58) Field of Classification Search ................ 372/11, 372/13, 16, 93, 97, 21, 22, 10
See application file for complete search history.

(56) References Cited

U.S. PATENT DOCUMENTS

| 3,879,686 A | 4/1975 | Milam et al. | 331/94.5 M |
|---|---|---|---|
| 3,969,684 A | 7/1976 | de Witte et al. | 331/94.5 |
| 4,311,360 A | 1/1982 | Hodson et al. | 350/174 |
| 4,326,175 A * | 4/1982 | Dehney et al. | 372/106 |
| 4,982,166 A | 1/1991 | Morrow | 330/4.3 |
| 5,231,641 A | 7/1993 | Ortiz | 372/21 |
| 5,307,369 A * | 4/1994 | Kimberlin | 372/108 |
| 5,315,604 A | 5/1994 | Chiu et al. | 372/25 |
| 5,319,195 A | 6/1994 | Jones et al. | 250/227.11 |
| 5,361,268 A | 11/1994 | Fossey et al. | 372/23 |
| 5,539,764 A | 7/1996 | Shields | 372/57 |
| 5,586,138 A | 12/1996 | Yokoyama | 372/97 |

(Continued)

FOREIGN PATENT DOCUMENTS

EP    1 422 807 A2    5/2005

(Continued)

OTHER PUBLICATIONS

U.S. Appl. No. 10/893,148, filed Jul. 16, 2004, assigned to current applicant.

(Continued)

*Primary Examiner*—Minsun Oh Harvey
*Assistant Examiner*—Patrick Stafford
(74) *Attorney, Agent, or Firm*—Stoel Rives LLP

(57) ABSTRACT

A plurality of subresonators (12, 14), having different design configurations, share a common resonator section (18) such that the lasing action can be substantially synchronized to provide coherent laser pulses that merge the different respective pulse energy profile and/or pulse width characteristics imparted by the configurations of the subresonators (12, 14). The subresonators (12, 14) may share a laser medium (42) in the common section, or each distinct subresonator section (28, 36) may have its own laser medium (42). Exemplary long and short subresonators (12, 14) generate specially tailored laser pulses having a short rise time and a long pulse width at one wavelength or two different wavelengths that may be beneficial for a variety of laser and micromachining applications including memory link processing.

57 Claims, 5 Drawing Sheets

U.S. PATENT DOCUMENTS

| | | | |
|---|---|---|---|
| 5,675,596 A | 10/1997 | Kong et al. | 372/25 |
| 5,745,284 A * | 4/1998 | Goldberg et al. | 359/344 |
| 5,756,924 A * | 5/1998 | Early | 102/201 |
| 5,822,355 A | 10/1998 | Ahn et al. | 372/97 |
| 5,917,843 A | 6/1999 | Greene | 372/19 |
| 5,998,759 A | 12/1999 | Smart | 219/121.69 |
| 6,169,014 B1 | 1/2001 | McCulloch | 438/487 |
| 6,210,401 B1 | 4/2001 | Lai | 606/12 |
| 6,252,195 B1 | 6/2001 | Mosavi et al. | 219/121.69 |
| 6,281,471 B1 | 8/2001 | Smart | 219/121.62 |
| 6,292,504 B1 * | 9/2001 | Halmos | 372/97 |
| 6,324,195 B1 | 11/2001 | Suzuki et al. | 372/25 |
| 6,340,806 B1 | 1/2002 | Smart et al. | 219/121.69 |
| 6,356,575 B1 | 3/2002 | Fukumoto | 372/97 |
| 6,366,596 B1 * | 4/2002 | Yin et al. | 372/92 |
| 6,541,731 B2 | 4/2003 | Mead et al. | 219/121.7 |
| 6,574,250 B2 | 6/2003 | Sun et al. | 372/25 |
| 6,580,055 B2 | 6/2003 | Iso | 219/121.7 |
| 6,664,498 B2 | 12/2003 | Forsman et al. | 219/121.6 |
| 6,697,394 B2 | 2/2004 | Tuennermann et al. | 372/26 |
| 6,703,582 B2 | 3/2004 | Smart et al. | 219/121.62 |
| 6,727,458 B2 | 4/2004 | Smart | 219/121.62 |
| 6,737,635 B2 | 5/2004 | Engelhardt et al. | 250/225 |
| 6,838,639 B2 | 1/2005 | Kreuter et al. | 219/121.76 |
| 6,878,899 B2 | 4/2005 | Smart | 219/121.61 |
| 6,879,605 B2 | 4/2005 | Kyusho et al. | 372/25 |
| 6,887,804 B2 | 5/2005 | Sun et al. | 438/940 |
| 6,940,888 B2 | 9/2005 | Liu | |
| 6,984,802 B2 | 1/2006 | Kuroiwa et al. | 219/121.73 |
| 2001/0021205 A1 | 9/2001 | Kittelmann et al. | 372/13 |
| 2002/0050488 A1 | 5/2002 | Nikitin et al. | 219/121.64 |
| 2002/0167581 A1 | 11/2002 | Cordingley et al. | 347/173 |
| 2003/0151053 A1 | 8/2003 | Sun et al. | 257/79 |
| 2004/0100999 A1 | 5/2004 | Liu | 372/10 |
| 2004/0129685 A1 | 7/2004 | Arai et al. | 219/121.7 |
| 2004/0134894 A1 | 7/2004 | Gu et al. | 219/121.68 |
| 2004/0134896 A1 | 7/2004 | Gu et al. | 219/121.69 |
| 2004/0188399 A1 | 9/2004 | Smart | 219/121.69 |
| 2005/0041976 A1 | 2/2005 | Sun et al. | 398/92 |
| 2005/0067388 A1 | 3/2005 | Sun et al. | 219/121.61 |
| 2005/0092720 A1 | 5/2005 | Gu et al. | 219/121.69 |
| 2005/0115936 A1 | 6/2005 | Gu et al. | 219/121.69 |
| 2005/0115937 A1 | 6/2005 | Gu et al. | 219/121.69 |
| 2005/0117620 A1 | 6/2005 | Thro et al. | 372/70 |
| 2005/0150879 A1 | 7/2005 | Gu et al. | 219/121.69 |
| 2005/0150880 A1 | 7/2005 | Gu et al. | 219/121.69 |
| 2005/0254530 A1 | 11/2005 | Sun | 372/22 |

FOREIGN PATENT DOCUMENTS

| | | |
|---|---|---|
| JP | 63-005891 | 1/1988 |
| JP | 1133765 | 2/1999 |
| JP | 2000-190087 | 7/2000 |
| JP | 2001-170788 | 6/2001 |
| JP | 2001-269790 | 10/2001 |
| JP | 2003-053575 | 2/2003 |
| JP | 2003-053576 | 2/2003 |
| JP | 2005-177788 | 7/2005 |
| WO | WO 2004/098003 A1 | 11/2004 |
| WO | WO2004/107510 | 12/2004 |
| WO | WO 2006/062744 A2 | 6/2006 |

OTHER PUBLICATIONS

Pending Claims of U.S. Appl. No. 10/818,920 as amended from those of U.S. Pat. Pub. No. 2004/0188399 (Previously submitted Reference BG).

Pending Claims of U.S. App. No. 10/107,890 as amended from those of U.S. Pat. Pub. No. 2002/0167581 (Previously sumitted Reference AK).

Bernstein et al., "Metal wire cutting by repeated application of low-power laser pulses," Rev. Sci. Instrum. 63(6) Jun. 1992, pp. 3516-3518.

North et al., Laser Coding of Bipolar Read-Only Memories, IEEE Journal of Solid State Circuits vol SC-11, No. 4 (1976).

English Abstract and Purported English Translation of Japanese Publication No. 63-005891.

International Search Report and Written Opinion concerning related International Application No. PCT/US05/04251.

\* cited by examiner

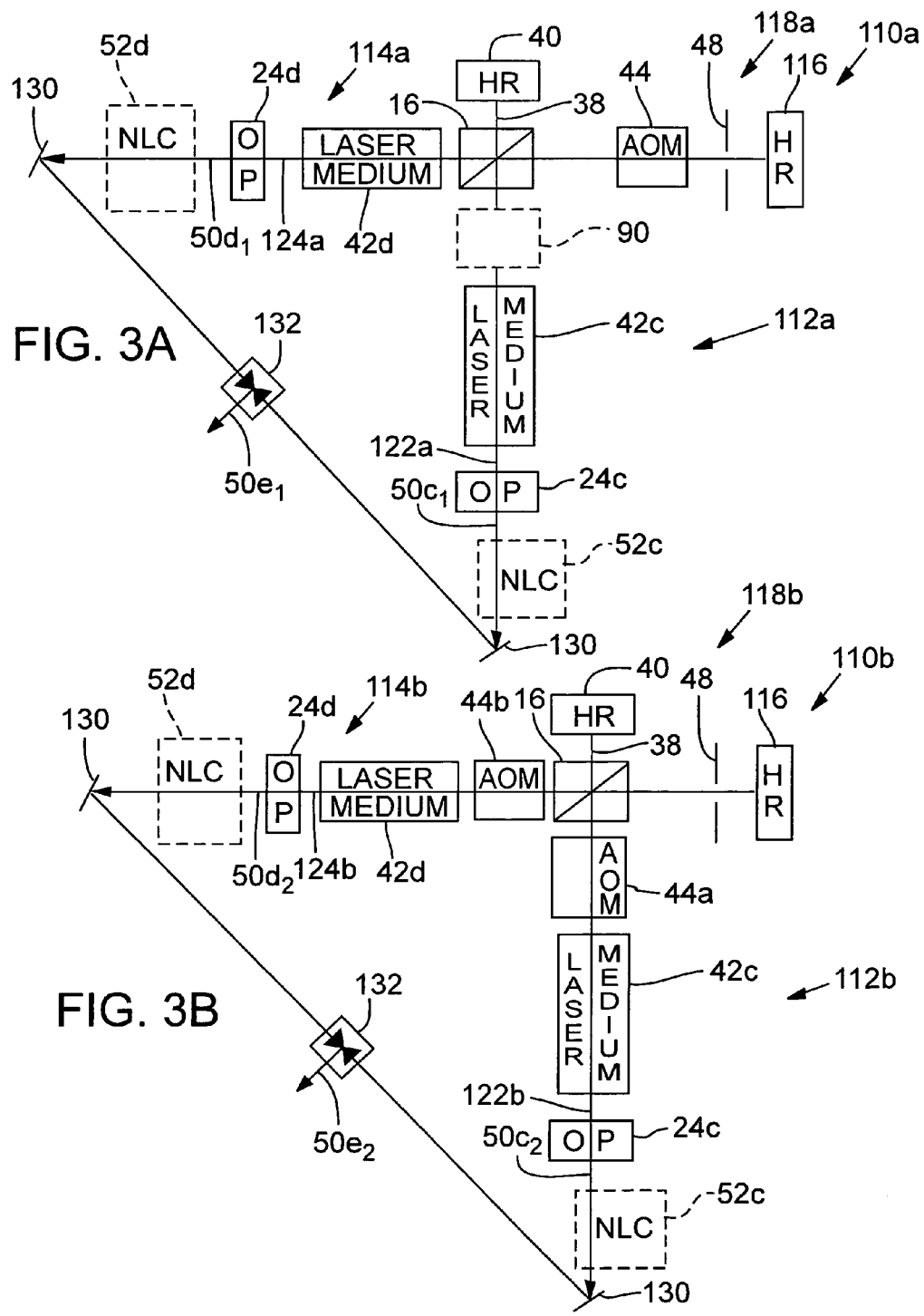

METHODS FOR SYNCHRONIZED PULSE SHAPE TAILORING

Related Applications

This patent application claims benefit of U.S. Provisional Application No. 60/635,053, filed Dec. 9, 2004.

COPYRIGHT NOTICE

© 2005 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

Controlling laser pulse width and/or power profile can be enhanced by employing a laser having two or more subresonators that share a common section.

BACKGROUND OF THE INVENTION

Diode-pumped (DP), solid-state (SS) lasers running at high pulse repetition rates are employed widely in a variety of applications including laser micromachining. In these lasers, the pulse width is largely determined by the resonator design and affected by laser pumping level and pulse repetition rate for a given laser medium. Once the resonator is constructed, there are few practical ways for changing the pulse width or temporal power profile for a given laser medium at a given pumping level and pulse repetition rate. However, for some applications such as processing links, particularly in stacks, better control of the pulse width and temporal energy profile while maintaining other laser pulse parameters is desirable.

Lasers employing a fast diode master oscillator/fiber amplifier (MOPA) configuration can deliver substantially square energy profile laser pulses with an adjustable pulse width of about 1 ns-10 ns, but current fiber amplifiers deliver random unpolarized laser output and typically have a disadvantageous wider wavelength spectrum output that imposes practical difficulties in achieving focused beam spot sizes that are sufficiently small to perform the desired micromachining operations without adversely affecting nearby substrates or other materials. U.S. patent application Ser. Nos. 10/921,481 and 10/921,765 of Sun et al., which are assigned to the assignee of this patent application, describe ways to obtain MOPA pulses with energy profiles that are specially tailored to particular applications.

Electro-optic (E-O) devices can also be employed as optical gates to reshape the energy profile or pulse width of laser pulses. However, operating the E-O devices at high repetition rates, especially above about 40 kHz, and synchronizing the laser pulses and the action(s) of an E-O device to a desired accuracy are extremely difficult to achieve under practical constraints.

Laser pulses emitted by two independent lasers that generate pulses having respectively different temporal energy profiles and pulse widths can be theoretically combined to provide a combined energy profile and pulse width of desirable features. However, in practice, combinations of such independently produced pulses suffer from laser pulse jitter, which is a random fluctuation of laser pulse initiation relative to laser pulse initiation control signals that is inherent to typical Q-switched lasers. In many applications, the pulse jitter is often greater than 5 ns-30 ns, depending on the laser design and the laser pulse repetition rate. This jitter is often too large to facilitate pulse combination with desirable accuracy, especially when the sets of combined pulses are desired to occur at intervals of less than 200 ns. For example, consistent and reproducible pulse energy profiles for an application like laser link processing could demand a timing stability between the two pulses of better than 1 ns. This synchronization problem becomes more significant at high repetition rates, especially above about 40 kHz, for example.

SUMMARY OF THE INVENTION

An object of some embodiments is to provide a laser and/or method for controlling the energy profile and/or pulse width of a laser pulse.

One embodiment of the invention employs two or more subresonators that share a common resonator section such that the lasing action is substantially self-synchronized. Each subresonator has a different design configuration, such as subresonator length, that is adapted to provide at least one different pulse energy profile and/or pulse width characteristic. When the shared part of the resonator includes the output port, the resulting laser output provides unique laser output pulses that merge energy profile and/or pulse width characteristics imparted by the configurations of the subresonators. In some embodiments, the subresonators share a laser medium in the common resonator section; and in some embodiments, each subresonator section may have its own laser medium. In one embodiment, long and short subresonators share a common resonator section to generate laser pulses having a short rise time and a long pulse width.

In some embodiments, the common resonator section includes a high reflectivity mirror, while each subresonator section has its own output port. The laser profile characteristics from each subresonator can then be recombined outside of the resonator while many of the adverse consequences of laser pulse jittering may be significantly reduced. The distinct profiles of the subsresonator outputs can be subjected to different optional harmonic conversion techniques before the profiles are recombined into a laser output pulse, permitting the laser output pulse to have a specially tailored profile using more than one laser wavelength. In other embodiments, such different wavelength profiles can be controlled to occur at different times with respect to each other.

Additional aspects and advantages will be apparent from the following detailed description of preferred embodiments, which proceeds with reference to the accompanying drawings.

BRIEF DESCRIPTION OF THE DRAWINGS

FIG. 3A is a schematic diagram of a laser composed of two subresonators, each of which includes a laser medium and an output port, that share a common resonator section with a high reflectivity mirror.

FIG. 3B is a schematic diagram of an alternative laser composed of two subresonators, each of which includes a laser medium, an AOM, and an output port, that share a common resonator section with a high reflectivity mirror.

DETAILED DESCRIPTION OF PREFERRED EMBODIMENTS

Figure 1:
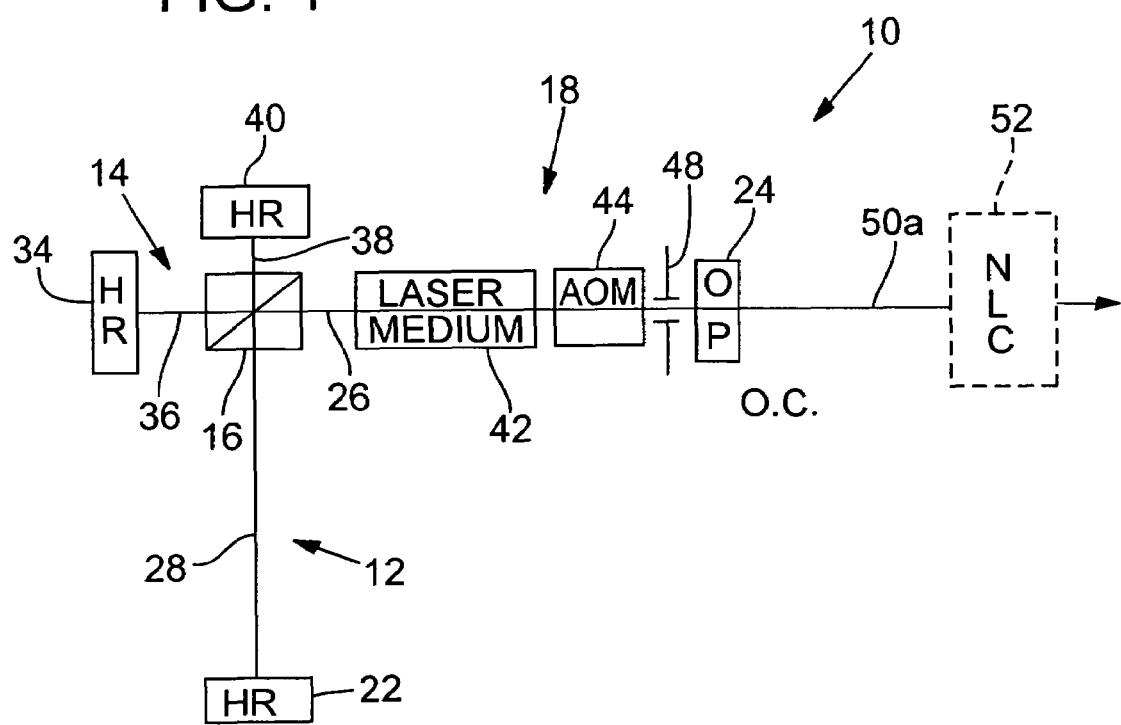
FIG. 1 is a schematic diagram of a laser composed of two subresonators having a common resonator section that includes a laser medium and an output port.

FIG. 1 is a schematic diagram of a laser 10 having a long subresonator 12 and a short subresonator 14 that are integrated with a beamsplitter 16 to employ a common resonator section 18. The beamsplitter 16 may be a mirror that is partly reflective and transmissive to permit oscillation to be established substantially simultaneously in both the long subresonator 12 and the short subresonator 14. The beamsplitter 16 may alternatively be a polarizer which will allow the oscillation of a substantially p-polarized laser beam in the short subresonator 14 and a substantially s-polarized laser beam in the long subresonator 12.

With reference to FIG. 1, the long subresonator 12 is defined by a long subresonator mirror 22 and an output port 24 that are positioned along an optical path 26. The long subresonator 12 includes the common resonator section 18 and a long subresonator section 28. The short subresonator 14 can be defined by a short subresonator mirror 34 and the output port 24 and, therefore, includes the common resonator section 18 and a short subresonator section 36. Laser 10 may also employ an optional loss reduction subsection 38 with a loss reduction mirror 40. The long subresonator mirror 22, the short subresonator mirror 34, and the optional loss reduction mirror 40 are preferably all highly reflective (HR) to the desired wavelength produced by a laser medium 42 that is positioned in the common resonator section 18.

The laser medium 42 preferably comprises a conventional solid-state lasant such as Nd:YAG, Nd:YLF, Nd:YVO$_4$, or Yb:YAG, making available all of their typical laser wavelengths as well as the harmonics thereof. In some embodiments, the laser medium 42 is directly or indirectly pumped from the side by one or more diodes or diode arrays (not shown). Skilled persons will, however, appreciate that the pumping source could be positioned behind one or more of the long resonator mirror 22, the short resonator mirror 34, or the optional loss reduction mirror 40 if they are properly adapted to be input couplers at the desired pumping wavelength. Other well-known optical components (not shown) could additionally or alternatively be employed to facilitate end-pumping. Skilled persons will also appreciate that one or more lamps, lasers, or other pumping devices could be employed to provide the pumping light and that the laser medium 42 could alternatively employ a different type of laser medium such as a gas, $CO_2$, excimer, or copper vapor laser medium.

The common resonator section 18 also preferably includes a Q-switch 44, such as an acousto-optic modulator (AOM) or an electro-optic modulator (EOM), positioned along the optical path 26. An aperture 48 may also be included in the common resonator section 18 and may preferably be positioned between the laser medium 42 or Q-switch 44 and the output port 24. The output port 24 is preferably an output coupling mirror that is partly reflective (PT) (about 5%-20% transmissive) to the preferred wavelength generated by the laser medium 42.

Exemplary laser output repetition rates are greater than about 1 Hz, greater than about 1 kHz, greater than about 25 kHz, greater than about 40 kHz, or greater than about 100 kHz and up to about or greater than 500 kHz. In typical embodiments, other pulse parameters include, but are not limited to, a laser energy of 0.1 µJ to 10 µJ and even up to 100 mJ at a laser output repetition rate from about 1 Hz up to about 500 kHz.

If desirable, one or more wavelength converters 52 can be positioned along the optical path 26 outside of the common resonator section 18 to convert the laser output 50a to harmonic laser output. Each wavelength converter 52 preferably comprises one or more nonlinear crystals, such as KTP (potassium titanium oxide phosphate, $KTiOPO_4$), BBO (beta barium borate, beta-$BaB_2O_4$), and LBO (lithium triborate, $LiB_3O_5$), for laser wavelength conversion. Typical fundamental laser wavelengths include, but are not limited to, 1064 nm, which has harmonic wavelengths at 532 nm (frequency doubled), 355 nm (frequency tripled), 266 nm (frequency quadrupled), and 213 nm (frequency quintupled). Skilled persons will appreciate that the wavelength converters 52 could alternatively be placed within the common resonator section 18 for intra-cavity frequency conversion.

Because the short subresonator 14 and the long subresonator 12 share the common resonator section 18, the laser energy and lasing action in both subresonators 12 and 14 is coupled. This coupling of laser action may resemble injection seeding from one subresonator to the other subresonator, so the lasing actions of the two (or more) subresonators are substantially self-synchronized into a single lasing pulse with high profile stability.

Figure 2A:
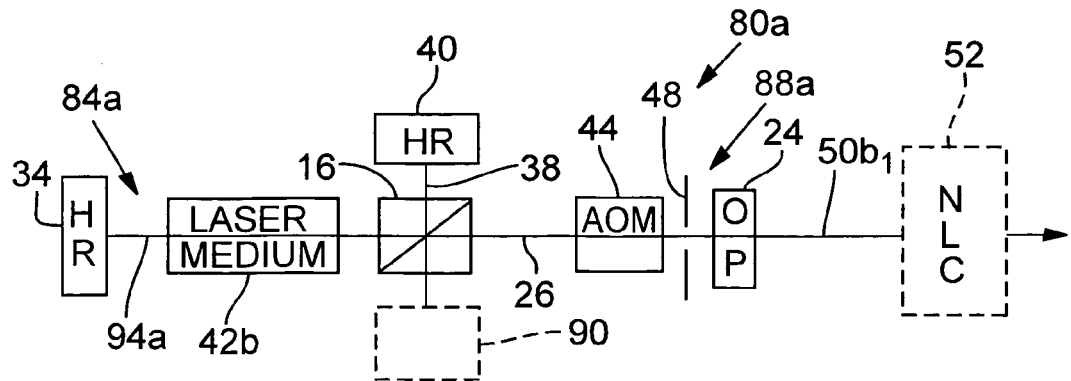
FIG. 2A is a schematic diagram of a laser composed of two subresonators, each of which includes a laser medium, that share a common resonator section in which no a laser medium is housed.

FIG. 2A is a schematic diagram of a laser 80a having a long subresonator 82a and a short subresonator 84a that are integrated with a beamsplitter 16 to employ a common resonator section 88a. The common resonator section 88a is in optical association with a long subresonator section 92a to form the long subresonator 82a, and the common resonator section 88a is in optical association with a short subresonator section 94a to form the short subresonator 84a. The laser 80a of FIG. 2A is very similar to the laser 10 of FIG. 1, so many of their corresponding components are similarly labeled.

One significant difference in laser 80 is that the long subresonator section 92a contains a laser medium 42a and the short subresonator section 94a contains a laser medium 42b to permit more versatility in the energy profiles 160 (FIGS. 4-7) of pulses of laser output $50b_1$. In most embodiments, laser media 42a and 42b preferably comprise the same lasant, but skilled persons will appreciate that laser medium 42a could be different from laser medium 42b in, for example, composition, size, configuration, or dopant concentration as long as their lasing wavelengths are substantially similar. In one embodiment, laser medium 42a has a rod, disk, rectangular parallelepiped, cube, chip, slab, or other shape, and laser medium 42b has a different one of these shapes.

In some preferred embodiments, laser media 42a and 42b are pumped with the same pumping coupling methods, by the same pumping sources, and at the same pumping levels and timing schemes through the use of conventionally known drive electronics. For some applications, such as link severing, CW pumping is generally preferred. In other embodiments, laser media 42a and 42b are pumped with different pumping coupling methods, by different pumping sources, and/or at different pumping levels and timing schemes through the use of conventionally known drive electronics. In some embodiments, for example, laser medium 42a can be end pumped while laser medium 42b is side pumped, or vice versa.

Although the common resonator section 88a could also contain a laser medium 42, such an embodiment is less preferred. An optional polarizer 90 may be employed in both the long subresonator section 92a and the short subresonator section 94a, but is shown positioned within the long subresonator section 92a as an example.

Figure 2B:
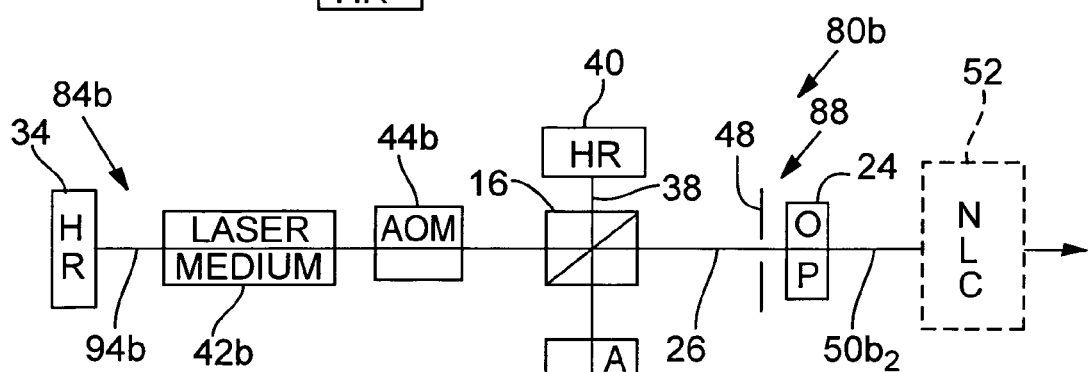
FIG. 2B is a schematic diagram of an alternative laser composed of two subresonators, each of which includes a laser medium and an AOM, that share a common resonator section in which no a laser medium is housed.

FIG. 2B is a schematic diagram of an alternative laser 80b that is very similar to laser 80a, so many of their corresponding components are similarly labeled. One significant difference in laser 80a is that the common Q-switch 44 is removed from the common resonator section 88b, and two independent Q-switches 44a and 44b (such as AOMs) are inserted into the long and short subresonator sections 92b and 94b, respectively. The Q-switches 44a and 44b can be initiated at the same time by a single driver (such as an RF driver, not shown) or by separate but synchronized independent drivers.

Alternatively, the Q-switches 44a and 44b can be initiated at different times by separate independent drivers to further enhance the tailoring capability of the profile 160 of the pulses of laser output $50b_2$. To ensure the laser energy coupling between the two subresonators 82b and 84b, skilled persons will appreciate that the delay time between the initiation of the Q-switches 44a and 44b should be limited such that the later initiated Q-switch should be initiated before the lasing action stops in the subresonator housing the other Q-switch. Although the polarizer 90 is not shown in FIG. 2B, a polarizer can be used in one or more of subresonator sections 92b and 94b and/or in common resonator section 88b.

FIG. 3A is a schematic diagram of a laser 110a having a long subresonator 112a and a short subresonator 114a that are integrated with a beamsplitter 16 to employ a common resonator section 118a. The common resonator section 118a is in optical association with a long subresonator section 122a to form the long subresonator 112a, and the common resonator section 118a is in optical association with a short subresonator section 124a to form the short subresonator 114a. The laser 110a of FIG. 3A is very similar to the laser 80a of FIG. 2A, so many of their corresponding components are similarly labeled. One significant difference between these lasers is that in the laser 110a the output port 24 is replaced with a highly reflective mirror 116 and the long and short subresonator mirrors 22 and 34 are replaced with short and long output ports 24c and 24d to provide distinct but temporally synchronized profiles 150 and 152 (FIGS. 4-7) of laser output $50c_1$ and $50d_1$ respectively. One or more additional or alternative apertures 48 may be included in the subresonator sections 122a and 124a between the laser media 42c and 42d and the respective output ports 24c and 24d.

Skilled persons will appreciate that, regardless of whether the profiles 150 and 152 of laser outputs $50c_1$ and $50d_1$ are recombined, these profiles 150 and 152 can be considered to form a single temporal pulse having specially tailored energy profile characteristics because the profiles 150 and 152 are temporally joined by the common resonator section with high timing accuracy. The laser outputs $50c_1$ and $50d_1$ can be directed and recombined through conventional optics, such as mirrors 130 and combiner 132, to provide synchronized laser output $50e_1$ having specially tailored pulses. Alternatively, the laser outputs $50c_1$ and $50d_1$ can be used independently to provide a specially tailored synchronized pulse with different energy profile portions impinging separate targets or target positions.

The laser outputs 50c and 50d may also be passed through optional wavelength converters 52c and 52d respectively, which may impart the same or different wavelength conversions. In one example, the laser output 50c is converted to a second harmonic wavelength and the laser output 50d is converted to a fourth harmonic wavelength. Such laser outputs $50c_1$ and $50d_1$ can be recombined to provide specially tailored pulses of laser output $50e_1$ such that each pulse contains two or more selected wavelengths.

FIG. 3B is a schematic diagram of an alternative laser 110b that is very similar to laser 110a shown in FIG. 3A, so many of their corresponding components are similarly labeled. One significant difference in laser 110b is that the common Q-switch 44 is removed from the common resonator section 118b, and two independent Q-switches 44a and 44b (such as AOMs) are inserted into the long and short subresonator sections 122b and 124b, respectively. The Q-switches 44a and 44b can be initiated at the same time by a single driver (such as an RF driver, not shown) or by separate but synchronized independent drivers.

The Q-switches 44a and 44b can be initiated at different times by separate independent drivers to further enhance the tailoring capability of the profile 160 of the pulses of laser output $50e_2$. In some embodiments, the delay time between the initiation of the Q-switches 44a and 44b (or vice versa) can be limited such that the later initiated Q-switch can be initiated before the lasing action stops in the subresonator housing the other Q-switch to further facilitate laser energy coupling between the two subresonators 112b and 114b.

The pulses of laser output 50a, $50b_1$, $50b_2$, $50c_1$, $50c_2$, $50d_1$, $50d_2$, $50e_1$, and $50e_2$ (generically laser output 50) as provided by any of the exemplary embodiments are preferably directed by a beam delivery system toward respective targets that may also be moved by a target positioning system. The beam delivery system may include a variety of optional conventional optical components, such as a beam expander, mirrors, and a focusing lens to produce a focused spot size. For link processing, the focused laser spot diameter is typically within the range of between about 0.5 µm and about 3 µm and preferably 40% to 100% larger than the width of the link, depending on the link width, link pitch size, link material and other link structure and process considerations. For other laser applications, the laser spot size can be adjusted from a few tenths of a micron to a few hundred microns to suit the application requirements.

A preferred beam delivery and positioning system is described in detail in U.S. Pat. No. 4,532,402 of Overbeck for Method and Apparatus for Positioning a Focused Beam on an Integrated Circuit. Such positioning system may alternatively or additionally employ the improvements or beam positioners described in U.S. Pat. No. 5,751,585 of Cutler et al., U.S. Pat. No. 6,430,465 B2 of Cutler, U.S. Pat. No. 6,816,294 of Unrath et al., and/or U.S. Pat. No. 6,706,999 of Barrett et al., which are assigned to the assignee of this patent application. Other fixed-head systems, fast positioner-head systems such as galvanometer-, piezoelectric-, or voice coil-controlled mirrors, or linear motor-driven conventional positioning systems or those employed in the 5300, 9300, or 9000 model series manufactured by Electro Scientific Industries, Inc. (ESI) of Portland, Oregon could also be employed.

Because the whole duration of each lasing pulse is shorter than 1,000 ns, (typically shorter than 300-500 ns), a typical link processing positioning system may move a laser spot position less than about 0.1 μm (a distance that is shorter than the link width) within such 1,000 ns period. So, the laser system can process links on-the-fly, i.e. the positioning system does not have to stop moving when the laser system fires a lasing pulse. In some embodiments, the laser spot of the long and short subresonator profiles encompasses the link width, regardless of when the spike or peak is positioned.

With reference again to FIGS. 1-3, the characteristics of the long subresonators 12, 82a, 82b, 112a, and 112b (generically long subresonator 12) and the short subresonators 14, 84a, 84b, 114a, and 114b (generically short subresonator 14) are different and independently selected to provide desired characteristics to the laser output 50. In one embodiment, the lengths of the long resonators 12 and the short resonators 14 are selected to impart particular pulse profile characteristics to the laser outputs 50. In particular, the lengths of the short subresonator sections 36, 94a, 94b, 124a, and 124b (generically short subresonator section 36) are adjusted to cooperate with the lengths of the respective common resonator sections 18, 88a, 88b, 118a, and 118b (generically common resonator section 18) to impart a short duration rising edge to the pulses of laser output 50, and the lengths of the long subresonator sections 28, 92a, 92b, 122a, and 122b (generically long subresonator section 28) are adjusted to cooperate with the lengths of the respective common resonator sections 18 to impart a long pulse width to the pulses of laser outputs 50. The particular values of these pulse characteristics can be independently selected, and then the lengths or other characteristics of the short subresonator sections 36, long subresonator sections 28, and common resonator sections 18 can be selected in cooperation with other laser parameters to achieve the desired pulse profile of laser outputs 50.

The relationship between resonator characteristics and pulse profile is relatively complex. However, for a given laser gain factor with given pumping energy, the pulse width is generally dependent upon the number of "round trips" the photons make between the resonator end mirrors during the lasing period. Thus, for a particular laser operated under similar parameters having a given laser medium 42, a given pumping level, and a given pulse repetition rate, the pulse width is generally directly proportional to the cavity length. So, generally, the shorter the cavity, the shorter the pulse width; and the longer the cavity, the longer the pulse width. In a link processing example, a typical Nd:YAG laser with a resonator of 8-10 cm long that is pumped by a 3 W diode has a pulse width of about 10 ns at 20 kHz. So, by keeping the other parameters generally the same and selectively shortening the resonator, one can obtain a 5 ns pulse width, or by selectively lengthening the resonator, one can obtain a 20 ns pulse width, for example. In addition, the rise time is affected by the pulse width. The rise time will generally be close to the full width at half the maximum peak power (the time between the points of the pulse profile at its half maximum power). So a shorter pulse width results when a shorter rise time is prescribed.

The components of each subresonator can, therefore, be tailored by skilled practitioners to facilitate generation of its independent pulse propagation characteristics in accordance with known techniques. For example, the placement and curvature of the highly reflective mirrors, the curvature of the surface and length of the laser medium 42, and the pumping and doping level may all be adjusted to make certain propagation characteristics from the two conjoined subresonators sufficiently similar so that they produce an aligned and substantially similar spot size on the surface of a workpiece. Alternatively, the components of each subresonator can be tailored so that certain propagation characteristics, such as spot size for example, are intentionally different. The transmissivity of the output couplers can also be adjusted to affect the pulse duration. With greater transmissivity decreasing the pulse width and lesser transmissivity increasing pulse width.

Link processing with specially tailored pulse shapes derived from the lasers described herein offers a wider processing window and a superior quality of severed links than does conventional link processing without sacrificing throughput. The versatility of laser output pulses permits better tailoring to particular link characteristics or other laser processing operations.

Figure 4A:
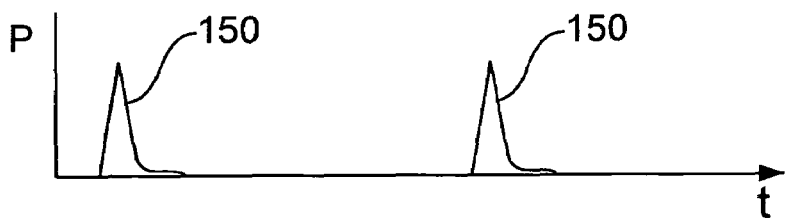
FIGS. 4A-4C show power versus time graphs of respective short subresonator profiles, long subresonator profiles, and specially tailored profiles of the resulting output pulses.
Figure 4B:
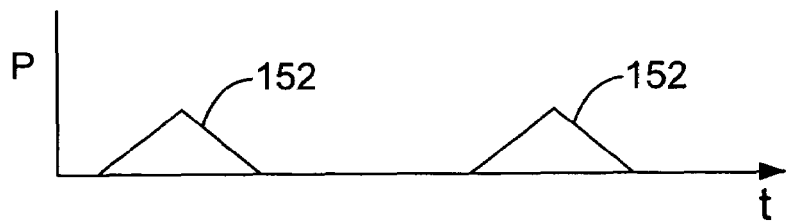
Figure 4C:
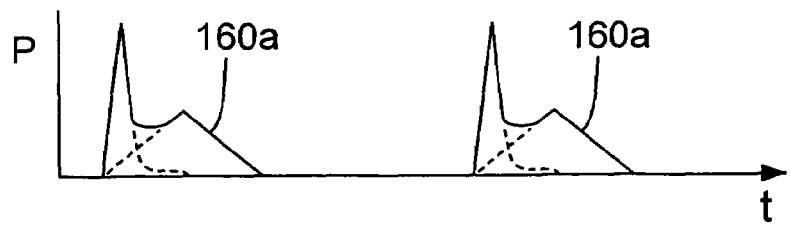

FIGS. 4A-4C (collectively, FIG. 4) show power versus time graphs of respective virtual short subresonator profiles 150 and long subresonator profiles 152, and exemplary specially tailored profiles 160a. Short subresonator profiles 150 and long subresonator profiles 152 are virtual in the sense that they could represent what each subresontor would provide independently if not coupled, but such short subresonator profiles 150 and long subresonator profiles 152 wouldn't really exist separately in many of the exemplary embodiments, such as those presented in FIGS. 1, 2A, and 2B.

With reference to FIG. 4A, for some embodiments, short subresonator sections 36 are adapted to provide short subresonator profiles 150 with a short pulse width of an exemplary 2 ns-15 ns and a rise time of less than about 8 ns and preferably less than about 5 ns. Skilled persons will appreciate that a variety of subranges or alternative ranges for the pulse width and rise time of such short subresonator profiles 150 are possible. One exemplary alternative range includes a pulse width of less than 10 ns and a rise time of less than 2 ns.

With reference to FIG. 4B, for some embodiments, long subresonator sections 28 are adapted to provide long subresonator profiles 152 with a long pulse width of greater 10 ns and preferably having an exemplary pulse width of 15 ns-50 ns and a rise time that is longer than 5 ns and typically longer than 8 ns or 10 ns. Skilled persons will appreciate that a variety of alternative ranges for the pulse width and rise time of such long subresonator profiles 152 are possible. Some exemplary alternative ranges include a pulse width of 15 ns-30 ns or a pulse width greater than 20 ns.

With reference to FIG. 4C, power profiles 160 exhibit a specially tailored energy profile that includes spike, rise time, and pulse width characteristics derived from the virtual short subresonator profiles 150 and the virtual long subresonator profiles 152. Each power profile 160a represents the power profile of a single temporal pulse of laser output 50 that can generally be a sum of the virtual profiles 150 and 152. Skilled persons will appreciate, however, that the virtual profiles 150 and 152 may not be entirely additive and that other derivations of the virtual profiles 150 and 152 may produce power profiles 160. Power profile 160a can be characterized as having a short rise time and a long pulse width. Alternatively, power profile 160a can be characterized as having two attached spikes with separated peaks. The peaks are preferably separated within a time period of from about 15 ns to about 300 ns, so the duration of each pulse may be greater than 300 ns.

The short rise times (and to some extent higher peak power) afforded by the short subresonators sections 36 promote excellent removal of, for example, most passivation or other layers overlying semiconductor memory links and even initiates removal of the links as well in some embodiments. The longer pulse width and lower peak power that are contributed from the long subresonators 12 help to complete link removal without compromising the integrity of the underlying or neighboring substrate.

Figure 5A:
FIGS. 5A-5C show power versus time graphs of respective short subresonator profiles, long subresonator profiles, and specially tailored profiles of the resulting output pulses when a first exemplary time delay is employed.
Figure 5B:
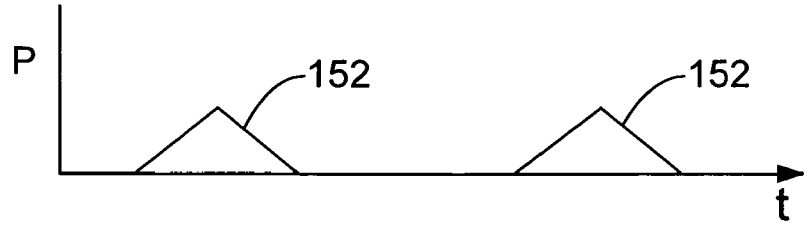
Figure 5C:
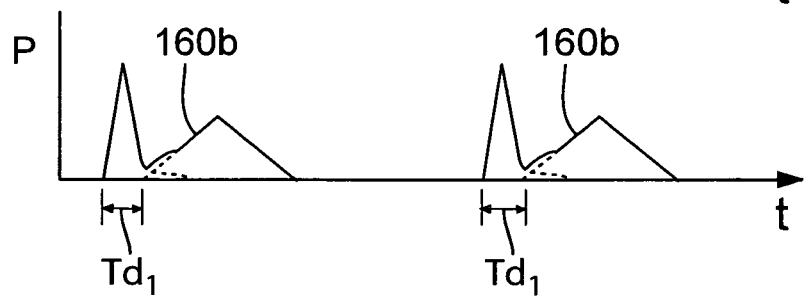

FIGS. 5A-5C (collectively, FIG. 5) show power versus time graphs of respective virtual short subresonator profiles 150 and long subresonator profiles 152 and exemplary specially tailored profiles 160b when an exemplary time delay $Td_1$ is employed.

With reference to FIGS. 2B, 3B, and 5, embodiments such as exemplified by lasers 80b and 110b that have Q-switches 44a and 44b in separate subresonator sections are well suited for introducing a time delay (generically Td) between the initiation of lasing action of the short and long subresonators or vice versa. In the exemplary embodiment shown in FIG. 5, Q-switch 44a in the long subresonator 82 is opened with a short delay time $Td_1$ that is shortly after Q-switch 44b is opened in the short subresontor 84, to produce the specially tailored profiles 160b. Each power profile 160b represents the power profile of a single temporal pulse of laser output 50. As discussed above, the virtual profiles 150 and 152 may or may not be entirely additive, or other derivations of them may produce variations of power profile 160b.

Figure 6A:
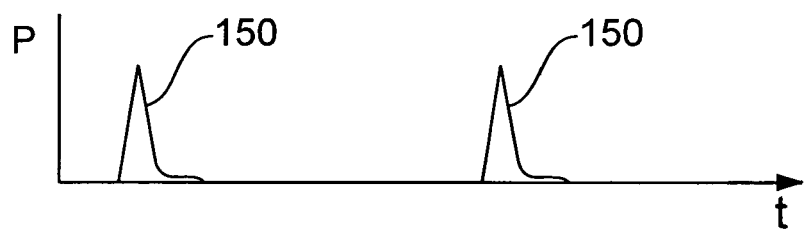
FIGS. 6A-6C show power versus time graphs of respective short subresonator profiles, long subresonator profiles, and specially tailored profiles of the resulting output pulses when a second exemplary time delay is employed.
Figure 6B:
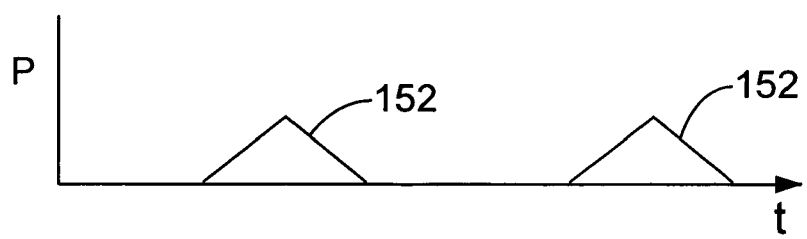
Figure 6C:
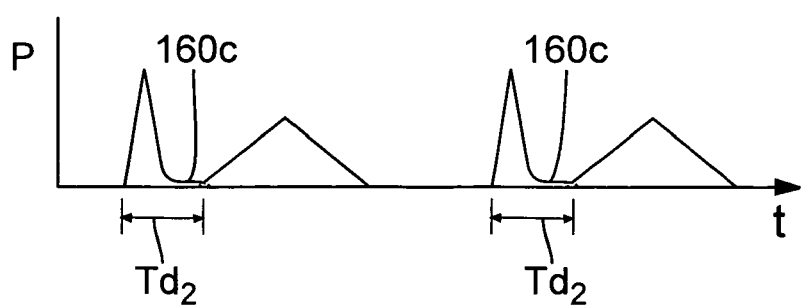

Similarly, FIGS. 6A-6C (collectively, FIG. 6) show respective power versus time graphs of respective virtual short subresonator profiles 150 and long subresonator profiles 152 and exemplary specially tailored profiles 160c when an exemplary long time delay $Td_2$ is employed. In the exemplary embodiment shown in FIG. 6, Q-switch 44a in the long subresonator 82 is opened after a long delay time $Td_2$ that ends just before the lasing action stops in the short subresontor 84, to produce the specially tailored profiles 160c. Each power profile 160c represents the power profile of a single temporal pulse of laser output 50. As discussed above, the virtual profiles 150 and 152 may or may not be entirely additive, or other derivations of them may produce variations of power profile 160c.

Figure 7A:
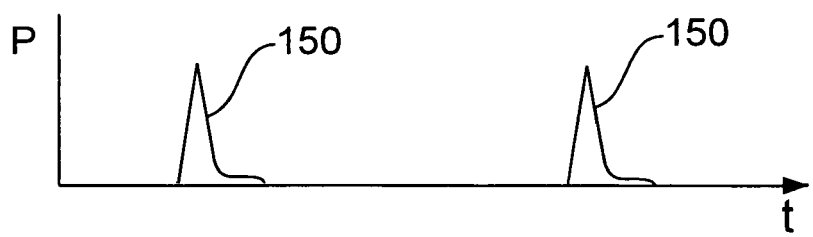
FIGS. 7A-7C show power versus time graphs of respective short subresonator profiles, long subresonator profiles, and specially tailored profiles of the resulting output pulses when a third exemplary time delay is employed.
Figure 7B:
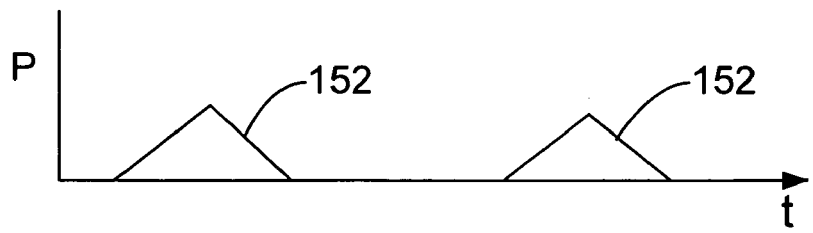
Figure 7C:
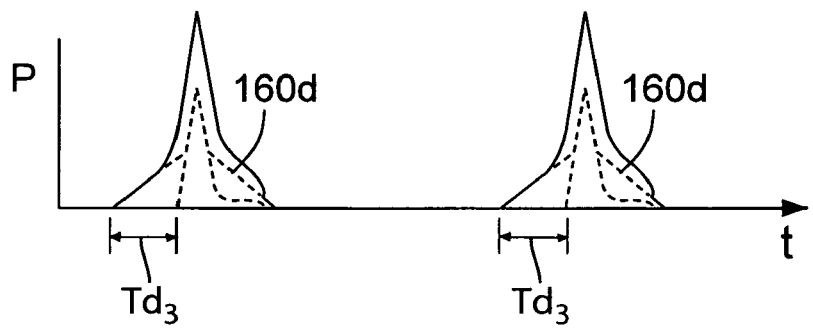

FIGS. 7A-7C (collectively, FIG. 7) show power versus time graphs of respective short subresonator profiles 150, long subresonator profiles 152, and specially tailored profiles 160d when an exemplary long time delay $Td_3$ is employed. In the exemplary embodiment shown in FIG. 7, AOM 44b in the short subresonator 84 is opened after AOM 44a with an intermediate delay time $Td_3$ that substantially centers the spike of profile 150 about the spike of profile 152 to produce the specially tailored profiles 160b. Each power profile 160d represents the power profile of a single temporal pulse of laser output 50. As discussed above, the virtual profiles 150 and 152 may or may not be entirely additive, or other derivations of them may produce variations of power profile 160d.

With respect to lasers 10, 80a, and 80b, the laser profiles 160 of the pulses emitted at the respective output ports are generally inseparable into their virtual profiles 150 and 152 from the conjoined subresonators (unless polarization elements are employed). Skilled persons will appreciate, however, that the short subresonator profiles 150 and the long subresonator profiles 152 emerge from separate output ports from lasers 110a and 110b and are subsequently recombined to provide single pulses of laser output 50 having profiles 160 with high profile stability and pulse-to-pulse consistency.

Alternative embodiments of lasers 110a and 110b permit a variety of unique and useful possibilities for the profiles 160. In one embodiment, the short subresonator profiles 150 are harmonically converted to an ultraviolet wavelength (UV) and the long subresonator profiles 152 are harmonically converted to a green wavelength to provide profiles 160 having a short rise time in the UV and a long pulse width in the green wavelength range. In another embodiment, the short subresonator profiles 150 are harmonically converted to a 355 nm wavelength and the long resonator profiles 152 remain at a 1064 nm fundamental wavelength to provide profiles 160 having a short rise time at 355 nm and a long pulse width at 1064 nm. In yet another embodiment, a 1.32 µm fundamental wavelength is employed to produce long subresonator profiles 152 and harmonically doubled (660 nm) or tripled (440 nm) short resonator profiles 150 to provide laser output pulses having a short rise time at a purple or blue wavelength and a long pulse width at a 1.32 µm wavelength. The initial small spot size UV short subresonator profiles 150 can be used to ablate or rupture the overlying passivation layer and remove part of the link while minimizing crater size and reducing the extent or formation of cracking. Then, the large spot size visible or IR long subresonator profiles 152 remove the rest of the link, particularly at a lower than conventional visible or IR output pulse energy or peak power, with reduced risk of damage to the silicon or other substrate.

Alternatively, the spike of the short resonator profiles 150 could be delayed to occur somewhere else along the pulse width of the long subresonator profiles 152. Such delayed spikes might be useful for machining through buried passivation layers, for example. Visible or IR spikes could alternatively be introduced to occur anywhere along the pulse width of a UV long subresonator profile 152 as desired for other applications.

The ability to specially tailor pulses to different profile portions at different wavelengths adds extra versatility. The mixing of conventional IR laser wavelengths and their harmonics for link blowing and other applications permits use of a smaller laser beam spot size for processing some layers of target and less problematic wavelengths for other layers of the target. New material or dimensions can be employed because the profile and duration of laser output 50 can be tailored and reduces the risk of damage to the underlying or neighboring passivation structure.

Because wavelengths much shorter than about 1.06 µm can be employed to produce critical spot size diameters of less than about 1.5 µm, the center-to-center pitch between the links processed with laser output 50 can be substantially smaller than the pitch between links blown by a conventional single IR laser beam-severing pulse. Therefore, the processing of narrower and denser links could be facilitated, resulting in better link removal resolution, permitting the links to be positioned closer together, and increasing circuit density.

Similarly, the versatility of better tailoring the laser pulse power profile 160 offers better flexibility in accommodating different or more complicated passivation characteristics.

For example, the passivation layers above or below the links can be made with material other than the traditional materials or can be modified, if desired to be other than a typical height.

The overlying passivation layer may include any conventional passivation materials such as silicon dioxide ($SiO_2$), silicon oxynitride (SiON), and silicon nitride ($Si_3N_4$). The underlying passivation layer may include the same passivation material as or different passivation material(s) from overlying passivation layer. In particular, the underlying passivation layer in the target structures may be formed from fragile materials, including but not limited to, materials formed from low K materials, low K dielectric materials, low K oxide-based dielectric materials, orthosilicate glasses (OSGs), fluorosilicate glasses, organosilicate glasses, a tetraethylorthosilicate-based oxide (TEOS-based oxide), methyltriethoxyorthosilicate (MTEOS), propylene glycol monomethyl ether acetate (PGMEA), silicate esters, hydrogen silsesquioxane (HSQ), methyl silsesquioxane (MSQ), polyarylene ethers, benzocyclobutene (BCB), SiCOH or SiCOH-derived film (such as "Black Diamond" sold by Applied Materials, Inc.), or spin on-based low K dielectric polymer (such as "SiLK" sold by Dow Chemical Company). The underlying passivation layers made from some of these materials are more prone to crack when their targeted links are blown or ablated by conventionally shaped laser pulse link-removal operations. Skilled persons will appreciate that $SiO_2$, SiON, $Si_3N_4$, low K materials, low K dielectric materials, low K. oxide-based dielectric materials, OSGs, fluorosilicate glasses, organosilicate glasses, HSQ, MSQ, BCB, SiLK™, and Black Diamond™ are actual layer materials, and TEOS, MTEOS, and polyarylene ethers are semiconductor condensate precursor materials. Even though some of the newer overlying passivation layers could be less receptive to conventional laser processing and/or some of the underlying passivation layers could be more sensitive with respect to conventional laser processing, the techniques described herein often greater versatility when dealing with layers with different properties.

It will be obvious to those having skill in the art that many changes may be made to the details of the above-described embodiments without departing from the underlying principles of the invention. The scope of the present invention should, therefore, be determined only by the following claims.

The invention claimed is:

1. A method for controlling the temporal energy profile characteristics of laser output pulses, comprising:
   employing a first subresonator with a first subresonator length that imparts a rise time characteristic to a first subresonator pulse profile in response to lasing pulse initiation, the first subresonator having a first subresonator section with a first subresonator section length that contributes to the first subresonator length;
   employing a second subresonator with a second subresonator length that imparts a pulse width characteristic to second subresonator pulse profile in response to lasing pulse initiation, the second subresonator having a second subresonator section with a second subresonator section length that contributes to the second subresonator length, and the second subresonator length being longer than the first subresonator length;
   employing a common resonator subsection that is shared by the first and second subresonators to cause the characteristics imparted from the first and second subresonator pulse profiles to be expressed during a lasing pulse, the common resonator subsection having a length that contributes to both the first subresonator length and the second subresonator length;
   initiating the lasing pulse to express the characteristics imparted from the first and second subresonator pulse profiles such that the first and second subresonators operate during at least a partly overlapping time; and
   emitting a laser output pulse
   having the rise time characteristic imparted from the first subresonator and the pulse width characteristic imparted from the second subresonator.

2. The method of claim 1 in which the first subresonator has a short first subresonator length that imparts a short rise time to the laser output pulse and the second subresonator has a long second subresonator length that imparts a long pulse width to the laser output pulse so that the laser output pulse exhibits a short rise time and a long pulse width.

3. The method of claim 1 in which the laser output pulse exhibits a rise time that is shorter than 8 ns and a pulse width that is longer than 10 ns.

4. The method of claim 1 in which the laser output pulse exhibits two separated peaks within a time period of from 15 ns to 300 ns.

5. The method of claim 1 in which a beam splitter is employed to integrate the first and second subresonators.

6. The method of claim 1 in which a polarizer is employed to integrate the first and second subresonators.

7. The method of claim 1 in which the common resonator subsection includes a Q-switch.

8. The method of claim 1 in which each of the first and second subresonator sections comprises a Q-switch.

9. The method of claim 1 in which the common resonator subsection includes a solid-state laser medium.

10. The method of claim 1 in which the common resonator subsection comprises a highly reflective mirror and the first and second subresoriator sections each have an output port.

11. The method of claim 1 in which the laser output pulse is converted to a different wavelength by use of an extra-cavity wavelength converter.

12. The method of claim 1 in which the common resonator subsection comprises one or more wavelength converters.

13. The method of claim 1 in which the initiation of the first and second subresonator pulse profiles is substantially simultaneous.

14. The method of claim 1 in which laser output pulses are generated a repetition rate of greater than 1 kHz.

15. The method of claim 1 in which laser output pulses are generated at a repetition rate of greater than 40 kHz.

16. The method of claim 1 in which a time delay is introduced between initiation of the first and second subresonator pulse profiles.

17. The method of claim 16 in which the time delay is shorter than 300 ns.

18. The method of claim 16 in which the time delay ends just before lasing pulse action stops in the subresonator that is first initiated.

19. The method of claim 1 in which the first and second subresonator sections each include a solid-state laser medium.

20. The method of claim 19 in which the solid-state laser media of the first and second subresonator sections comprise the same lasant material.

21. The method of claim 19 in which the solid-state laser media of the first and second subresonator sections comprise different lasant materials that emit at a substantially similar wavelength.

22. The method of 21 in which the solid-state laser media of the first subresonator section comprises Nd:YVO, and the solid-state laser media of the second subresonator section comprises Nd:YAG.

23. The method of claim 19 in which the solid-state laser media of the first and second subresonator sections have different dimensions.

24. The method of claim 19 in which the solid-state laser media of the first and second subresonator sections have dimensions that are about the same.

25. The method of claim 19 in which the first and second subresonator sections each comprise one or more wavelength converters.

26. The method of claim 19 in which the solid-state laser media of the first and second subresonator sections are pumped at different levels.

27. The method of claim 19 in which the solid-slate laser media of the first and second subresonator sections are pumped at levels that are about the same.

28. The method of claim 19 in which pumping is initiated for the solid-state laser media of the first and second subresonator sections at different times.

29. The method of claim 19 in which pumping is initiated for the solid-state laser media of the first and second subresonator sections at about the same time.

30. The method of claim 19 in which the solid-state laser media of the first and second subresonator sections have different shapes.

31. The method of claim 19 in which the solid state laser media are CW pumped.

32. The method of claim 1 in which the common resonator subsection includes a common output port from which the laser output pulse is emitted.

33. The method of claim 32 in which the laser output pulse has a temporal energy profile that is inseparable into the pulse profiles of the first and second subresonators.

34. The method of claim 32 in which the common output port comprises an output coupling mirror.

35. The method of claim 1 in which each of the first and second subresonator sections has its own output port.

36. The method of claim 35 in which each of the first and second subresonator sections includes a wavelength converter.

37. The method of claim 35 in which the first subresonator pulse profile and the second subresonator pulse profile propagating from the respective output ports of the first and second subresonator sections are combined along a common optical path to provide the laser output pulse.

38. The method of claim 37 in which a first emission from the first subresonator section and/or a second emission from the second subresonator section is converted to a different wavelength such that the first and second emissions combined along the optical path include at least two wavelengths.

39. The method of claim 37 in which a first emission from the first subresonator section and/or a second emission from the second subresonator section have different spot size characteristics.

40. The method of claim 37 in which the initiation of the first and second subresonator pulse profiles is substantially simultaneous.

41. The method of claim 37 in which a time delay is introduced between initiation of the first and second subresonator pulse profiles.

42. The method of claim 37 in which the first and second subresonator pulse profiles express their spikes at substantially the same time.

43. The method of claim 37 in which laser output pulses are propagated at a repetition rate of greater than 40 kHz.

44. The method of claim 37 in which the laser output pulse has an output profile with a visible- or UV-wavelength spike and an IR tail.

45. The method of claim 44 in which the IR tail comprises a wavelength of one of about 1.047, 1.054, 1.064, or 1.32 microns.

46. The method of claim 1 in which the laser output pulse is employed to sever a link on-the-fly.

47. A method for generating a laser output pulse having a laser output pulse pulse profile that includes at least two wavelengths, comprising:
    employing a common resonator subsection having a common resonator subsection length along a common optical path;
    employing a beam splitter positioned to intersect the common optical path;
    employing a first subresonator section including a first subresonator path that intersects the common optical path in proximity to the beam splitter, the first subresonator section having a first subresonator section length, the first subresonator section and the common resonator subsection forming a first subresontaor having a first subresonator length that includes the first subresonator section length and the common resonator subsection length, and the first subresonator length imparting to each laser pulse a first spike characteristic and a first pulse width characteristic;
    employing a second subresonator section including a second subresonator path that intersects the common optical path in proximity to the beam splitter, the second subresonator section having a second subresonator section length, the second subresonator section and the common resonator subsection forming a second subresonator having a second subresonator length that includes the second subresonator section length and the common resonator subsection length, the second subresonator length imparting to each laser pulse a second spike characteristic and a second pulse width characteristic, and the second subresonator length being longer than the first subresonator length;
    employing first and second solid-state laser media positioned in the respective first and second subresonator sections for receiving laser pumping light from one or more laser pumping sources, the first and second laser media being adapted to facilitate lasing action at a fundamental wavelength, wherein the common resonator section links the lasing action in the first subresonator with the lasing action in the second subresonator such that the first and second subresonators operate during at least a partly overlapping time to cause propagation of a laser pulse that exhibits at least the first spike characteristic imparted from the first subresonator and the second pulse width characteristic imparted from to second subresonator;
    employing a first output port from the first subresonator section and a second output port from the second subresonator section to split each laser pulse into to first laser output that propagates through the first output port and second laser output that propagates through the second output port the first laser output exhibiting the first spike and pulse width characteristics and the second laser output exhibiting the second spike and second pulse width characteristics;
    employing a first wavelength converter positioned along a first beam path from the first output port to convert the first laser output to a first wavelength and/or employing a second wavelength converter positioned along a second beam path from the second output port to convert the second laser output to a second wavelength; and combining the first laser output with the second laser output to provide a laser output pulse having at least first spike characteristics at the fundamental or first wavelength and having at least second pulse width characteristics at the fundamental or second wavelength such that the laser output pulse exhibits at least two distinct wavelengths.

48. A method for controlling the temporal energy profile and/or pulse width characteristics of a laser output pulse, comprising:

employing a first subresonator with a first design feature that imparts a first energy profile and/or pulse width characteristic to each laser pulse, the first subresonator including a first laser medium;

employing a second subresonator with a second design feature that imparts a second energy profile and/or pulse width characteristic to each laser pulse, the first subresonator including a second laser medium, the first and second design features imparting different characteristics to the pulses of laser output;

employing a common resonator subsection that is shared by the first and second subresonators to couple lasing action in the first and second subresonators such that the first and second subresonators operate during at least a partly overlapping time, at least one of the first subresonator, the second subresonator, or the common subresonator section including a Q-switch; and directing at a target a laser output pulse having laser output energy profile and/or pulse width characteristics derived from the first and second energy profile and/or pulse width characteristics.

49. The method of claim 48 in which a beam splitter is employed to integrate the first and second subresonators.

50. The method of claim 48 in which the first subresonator has a length that is shorter than the second subresonator such that the first subresonator imparts a short rising edge to the pulses of laser output and the second subresonator imparts a long pulse width to the pulses of laser output so that the laser output pulses exhibit a short rising edge and a long pulse width.

51. The method of claim 48 in which the common resonator subsection includes the Q-switch.

52. The method of claim 48 in which the common resonator subsection provides a common output port for the laser output pulses.

53. The method of claim 48 in which the common resonator subsection includes a solid-state laser medium.

54. The method of claim 48 in which the first and second subresonators each include a solid-state laser medium and a Q-switch.

55. The method of claim 48 in which the pulses of laser output are converted to a different wavelength by use of an extra-cavity wavelength converter.

56. The method of claim 48 in which the common resonator subsection comprises a highly reflective mirror and the first and second subresonators each have an output port.

57. The method of claim 48 in which the first and second laser media comprise lasants that have different characteristics.

* * * * *